(12) United States Patent
Ballou et al.

(10) Patent No.: US 6,991,413 B2
(45) Date of Patent: Jan. 31, 2006

(54) DRIVE ANCHOR

(75) Inventors: Daniel B. Ballou, Salem, MA (US); David S. McCue, Manchester, MA (US); Adam P. Stevens, York, ME (US)

(73) Assignee: McCue Corporation, Salem, MA (US)

( * ) Notice: Subject to any disclaimer, the term of this patent is extended or adjusted under 35 U.S.C. 154(b) by 15 days.

(21) Appl. No.: 10/758,456

(22) Filed: Jan. 14, 2004

(65) Prior Publication Data
US 2005/0152766 A1    Jul. 14, 2005

(51) Int. Cl.
*F16B 13/06* (2006.01)

(52) U.S. Cl. .......................... 411/15; 411/45; 411/57.1; 411/71

(58) Field of Classification Search .................. 411/15, 411/41, 44–48, 57.1, 71–73; 52/157, 165
See application file for complete search history.

(56) References Cited

U.S. PATENT DOCUMENTS

| | | | | |
|---|---|---|---|---|
| 1,855,329 A | * | 4/1932 | Wagner | 411/72 |
| 2,120,577 A | * | 6/1938 | Schulte | 411/71 |
| 2,181,103 A | * | 11/1939 | Davis | 411/44 |
| 3,007,364 A | * | 11/1961 | Dickie | 411/15 |
| 3,894,589 A | * | 7/1975 | Ciraud | 175/23 |
| D256,552 S | | 8/1980 | Rowinski | |
| 4,259,890 A | * | 4/1981 | Walsh | 411/80.2 |
| D263,557 S | | 3/1982 | Einhorn | |
| 4,353,673 A | | 10/1982 | Lesowsky | |
| 4,500,238 A | | 2/1985 | Vassiliou | |
| 4,926,785 A | * | 5/1990 | Lamson | 116/209 |
| 6,406,235 B1 | * | 6/2002 | Bantle | 411/45 |
| 6,494,653 B2 | | 12/2002 | Remmers | |

* cited by examiner

*Primary Examiner*—Flemming Saether
(74) *Attorney, Agent, or Firm*—Lahive & Cockfield, LLP

(57) ABSTRACT

A method and apparatus removably and replaceably mounting a member in a hole that provides sufficient support for the member while also improving installation time of the anchor holding the member in place includes use of a drive anchor system. The drive anchor system includes a drive anchor. The drive anchor includes a hollow shaft having an internal chamber, an external wall, a first end, and a second end. A surface feature is disposed on the external wall for providing anchoring functionality. A bifurcating crevice extends from the second end of the hollow shaft toward the first end of the hollow shaft, and creates a first leg and a second leg of the hollow shaft. A member coupling is sized and dimensioned to fit within the internal chamber of the drive anchor, such that the member can couple with the member coupling. The drive anchor can be positioned in a hole and the member coupling is configured to be driven into the internal chamber expanding the first leg and the second leg outwardly against walls of the hole to frictionally mount the member coupling within the internal chamber and also to frictionally mount the drive anchor within the hole and anchored with the surface feature.

13 Claims, 5 Drawing Sheets

DRIVE ANCHOR

FIELD OF THE INVENTION

The present invention relates to a system and method for mounting a member, and more particularly to an anchoring device for receiving a member and removably and replaceably mounting the member in the ground, or other surface.

BACKGROUND OF THE INVENTION

There are a number of different members, such as posts, or shafts, that are desired to be mounted in the ground, or other location. Conventional methods for mounting such members include digging, drilling, or otherwise forming a hole, placing the member in the hole, and filling the hole with concrete, firmly compacted soil, or other form of adhesive. This process is effective but time consuming. Furthermore, if the member is somehow damaged, it is often very difficult to remove the member from its permanent mount.

One solution to this difficulty is the process of mounting a hollow sleeve in the hole, and then mounting the member within the sleeve. More specifically, the hole is formed, and the sleeve is driven into the hole and surrounded by concrete, compacted soil, or other form of adhesive. These processes permanently mount the sleeve within the hole. The member is then removably mounted by being dropped into the sleeve. In this instance, the member is more easily replaced by simply pulling the member out of the sleeve. However, the process of installing the sleeve, surrounding the sleeve with the form of adhesive, and then waiting for the adhesive to set, is often time consuming and less efficient than might otherwise be possible with the present invention. In addition, the resulting sleeve is permanently mounted (in the case of concrete or other adhesive) in the hole, making later removal of the sleeve just as difficult as the above-described removal of the member from direct permanent mounting.

A more suitable manner of securing a member within a hole is desired that will provide the ability to remove and replace the member and the mounting mechanism more easily, but that will still provide a stable and reliable mount for supporting the member in the hole.

SUMMARY OF THE INVENTION

There is a need for a removable and replaceable method of mounting a member in a hole that provides sufficient support for the member, while also improving installation time of the anchor holding the member in place. The present invention is directed toward further solutions to address this need.

In accordance with one embodiment of the present invention, a drive anchor system for mounting a member includes a drive anchor. The drive anchor includes a hollow shaft having an internal chamber, an external wall, a first end, and a second end. A surface feature is disposed on the external wall for providing anchoring functionality. A bifurcating crevice extends from the second end of the hollow shaft toward the first end of the hollow shaft, and creates a first leg and a second leg of the hollow shaft. A member coupling is sized and dimensioned to fit within the internal chamber of the drive anchor, such that the member can couple with the member coupling. The drive anchor can be positioned in a hole and the member coupling is configured to be driven into the internal chamber expanding the first leg and the second leg outwardly against walls of the hole to frictionally mount the member coupling within the internal chamber, and also to frictionally mount the drive anchor within the hole such that it is anchored with the surface feature.

In accordance with aspects of the present invention, the external wall includes a longitudinal taper decreasing from the first end to the second end of the hollow shaft. An end flange can be disposed at the first end of the hollow shaft. A centering ridge can be disposed around a perimeter of the hollow shaft proximal to the first end of the hollow shaft to center the hollow shaft in the hole. The hollow shaft can have a cross-section of a geometric shape. The geometric shape can be at least one of a circle, a parallelogram, and a multi-sided shape.

In accordance with further aspects of the present invention, the surface feature includes at least one ridge and/or at least one raised protrusion. The surface feature can be disposed along a substantial portion of the external wall of the hollow shaft.

In accordance with further aspects of the present invention, the member coupling can include a hollow receptacle. The member coupling can further include an end flange.

In accordance with further aspects of the present invention, the member can include a shaft or post type of structure. The member coupling can be removably and replaceably mounted.

In accordance with one embodiment of the present invention, a method of installing a drive anchor system for mounting a member, the drive anchor system having a drive anchor having a first end and a second end, a surface feature disposed on the drive anchor, and a bifurcating crevice creating a first leg and a second leg of the hollow shaft, the drive anchor system further including a member coupling sized and dimensioned to fit within the drive anchor, such that the member can mount within the member coupling and enable the mounting of the member, is provided. The method includes positioning the drive anchor in a hole. The member coupling is inserted and driven into the drive anchor causing the first leg and the second leg of the hollow shaft to extend outwardly against walls of the hole, such that the member coupling is frictionally mounted in the drive anchor, and the drive anchor is frictionally mounted within the hole and anchored with the surface feature.

In accordance with aspects of the present invention, the external wall can include a longitudinal taper decreasing from the first end of the hollow shaft to the second end of the hollow shaft. An end flange can be disposed at the first end of the hollow shaft. A centering ridge can be disposed around a perimeter of the hollow shaft proximal to the first end of the hollow shaft to center the hollow shaft in the hole as the member coupling is driven into the driving anchor. The hollow shaft can have a cross-section of a geometric shape. The geometric shape can include at least one of a circle, a parallelogram, and a multi-sided shape.

In accordance with further aspects of the present invention, the surface feature can include at least one ridge and/or at least one raised protrusion. The surface feature can be disposed along a substantial portion of the external wall of the hollow shaft.

In accordance with further aspects of the present invention, the member coupling can include a hollow receptacle. The member coupling can further include an end flange. The member can be in the form of a shaft or post type of structure.

In accordance with one embodiment of the present invention, a drive anchor for mounting a member coupling in a hole is provided. The drive anchor can include a hollow shaft having an internal chamber, a first end, a second end, and an external wall. A surface feature can be disposed on the external wall for providing anchoring characteristics of the drive anchor. A bifurcating crevice can extend from the second end of the hollow shaft toward the first end of the hollow shaft, and create a first leg and a second leg of the hollow shaft. The drive anchor can be configured to be driven into the hole and the member coupling driven into the internal chamber expanding the first leg and the second leg outwardly to frictionally mount the member coupling within the internal chamber and also to frictionally mount the drive anchor within the hole and anchored with the surface feature.

BRIEF DESCRIPTION OF THE DRAWINGS

The present invention will become better understood with reference to the following description and accompanying drawings, wherein.

DETAILED DESCRIPTION

Figure 1:
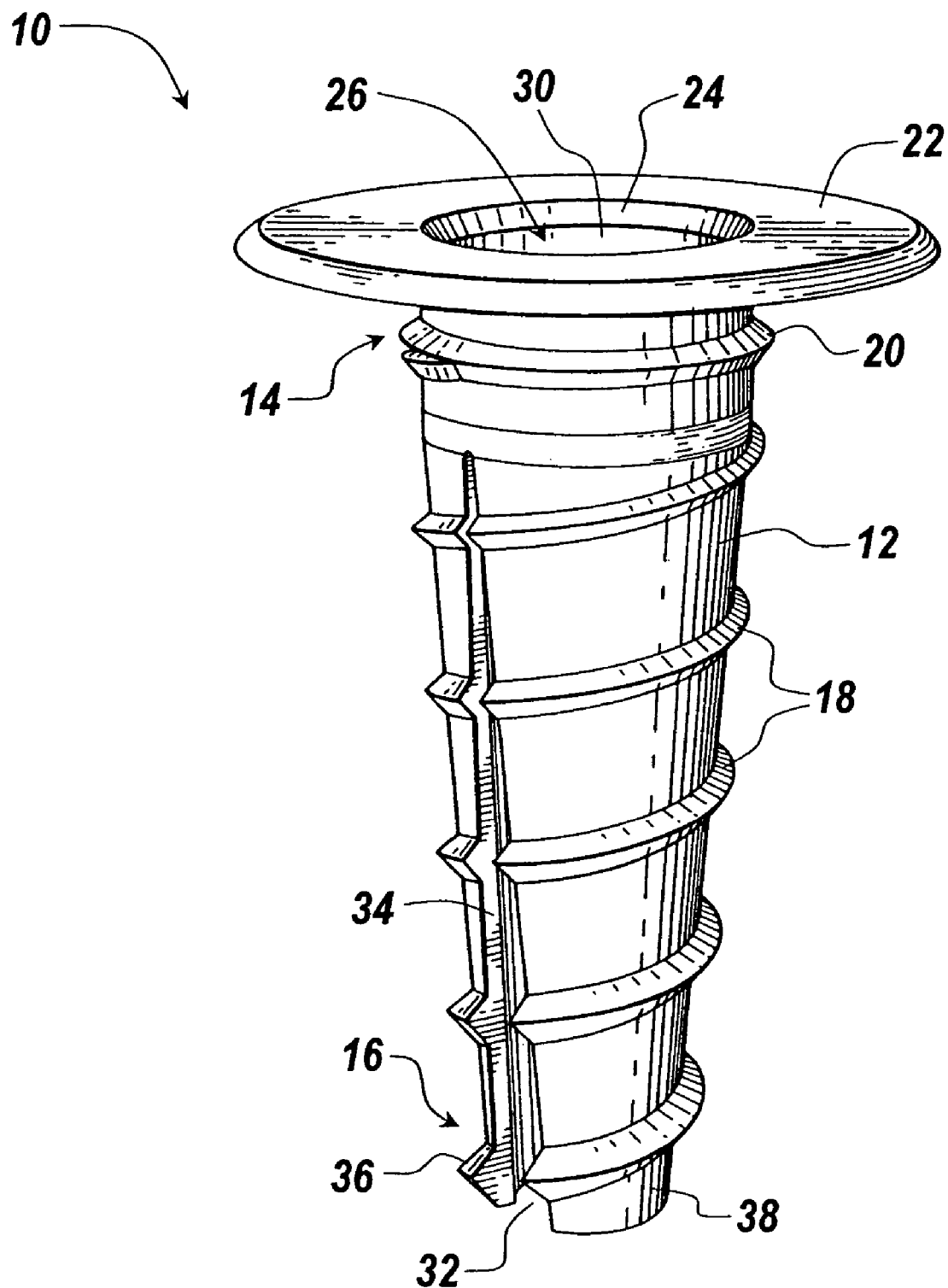
FIG. 1 is a perspective view of a drive anchor, according to one aspect of the present invention.

An illustrative embodiment of the present invention relates to a drive anchor useful in mounting a member, such as a post or shaft, or other member, in a member coupling, such as a hollow receptacle. The drive anchor provides an efficient mechanism for replaceable and removable mounting of the member coupling, which can then support the member to be mounted. The drive anchor is configured to be placed or driven into a hole. The drive anchor is bifurcated, creating a first leg and a second leg, which expand outwardly upon installation of the hollow receptacle, and hold the flange and the receptacle in place. The drive anchor of the present invention relies primarily upon friction forces and surface features on the drive anchor to hold the drive anchor and hollow receptacle (or other member coupling) in place within the hole. As such, there is no requirement of special adhesive, concrete, compacted soil, or other bonding agent to mount the drive anchor or the member coupling in place.

FIGS. 1 through 5F, wherein like parts are designated by like reference numerals throughout, illustrate example embodiments of a drive anchor and corresponding mounting member couplings, according to the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed, such as the size, shape, or type of elements or materials, in a manner still in keeping with the spirit and scope of the present invention.

FIG. 1 is a perspective illustration of a drive anchor 10 in accordance with one example embodiment of the present invention. The drive anchor 10 has a hollow shaft 12, which tapers from a first end 14 toward a second end 16, such that the first end 14 has a larger circumference relative to the second end 16. The hollow shaft 12 includes a plurality of surface features 18. The number of surface features 18, the location of the surface features 18, and the configuration of the surface features 18 can vary, as is understood by one of ordinary skill in the art. Such variation will be discussed in more detail later herein. Furthermore, the cross-section of the hollow shaft 12 can likewise vary in that the geometric shape of the cross-section can take a number of different forms, also as understood by one of ordinary skill in the art, and described in more detail later herein.

In characterizing the hollow shaft 12, the term hollow indicates the existence of an internal cavity 26 disposed within the hollow shaft 12. The internal cavity 26 provides a location in which a member coupling 28 (see FIG. 2) can be inserted, as later discussed in detail herein. The internal cavity 26 does not need to extend a substantial width of the hollow shaft 12, but the internal cavity 26 must extend the length of the hollow shaft 12, such that the internal cavity 26 creates a first opening 30 at the first end 14 of the hollow shaft 12, and extends through to the second end 16 of the hollow shaft 12 to create a second opening 32. The width of the internal cavity 26 can extend in such a manner as to make the hollow shaft 12 resemble a tube or pipe, as is known to one of ordinary skill in the art. Otherwise, the internal cavity 26 need only maintain a size and dimension suitable for receiving the member coupling 28, as desired.

The hollow shaft 12 of the drive anchor 10 can further include a centering ridge 20 disposed about the outer perimeter of the hollow shaft 12 at the first end 14. The centering ridge 20 is useful in aiding the position of the hollow shaft when placed or driven into a hole. The centering ridge 20 extends a substantially constant distance from the surface of the hollow shaft 12 against walls of the hole in which the drive anchor 10 mounts, such that the centering ridge 20 centers the drive anchor 10 in the hole. The centering ridge 20 is shown as a continuous ring in the drawings; however, the centering ridge 20 can be intermittent.

The drive anchor 10 can further include an end flange 22. The end flange 22 is optionally placed at the first end 14 of the hollow shaft 12. The end flange 22 can be made as a part of the hollow shaft 12, or can be attached to the hollow shaft 12 using a bonding agent, heat, or other bonding or fastening method. The end flange 22 does not cap off the end of the hollow shaft 12, but instead maintains a flange opening 24 that leads to the internal cavity 26 of the hollow shaft 12 through the first opening 30.

The drive anchor 10 includes at least one bifurcation 34, which creates a first leg 36 and a second leg 38 at the second end 16 of the hollow shaft 12. The bifurcation extends from the second end 16 of the hollow shaft 12 back toward the first end 14 of the hollow shaft 12, but does not extend through the first end 14. The bifurcation 34 can have a substantially "V" shape, or can have a rounded or squared apex, as would be understood by one of ordinary skill in the art. Although the figures show only a single bifurcation 34 in any one illustration, there can be multiple bifurcations 34 extending along a single hollow shaft 12, as would be understood by one of ordinary skill in the art, each bifurcation 34 creating additional legs, such as the first leg 36 and the second leg 38.

It should further be noted that the drive anchor 10 as illustrated in the accompanying drawings is shown in most instances having a taper extending from the first opening 30 to the second opening 32, generally. The taper narrows the outer perimeter circumference of the drive anchor 10 to make it easier for the drive anchor 10 to forge a path through a material, such as earth, when initially put into position. However, the taper on the drive anchor 10 is not required (see FIG. 5A). For example, in the instance where the hole in which the drive anchor 10 is to be mounted is pre-existing, there is no need for a taper to forge a path through the material. As such, the drive anchor can be un-tapered in such instances.

Figure 2:
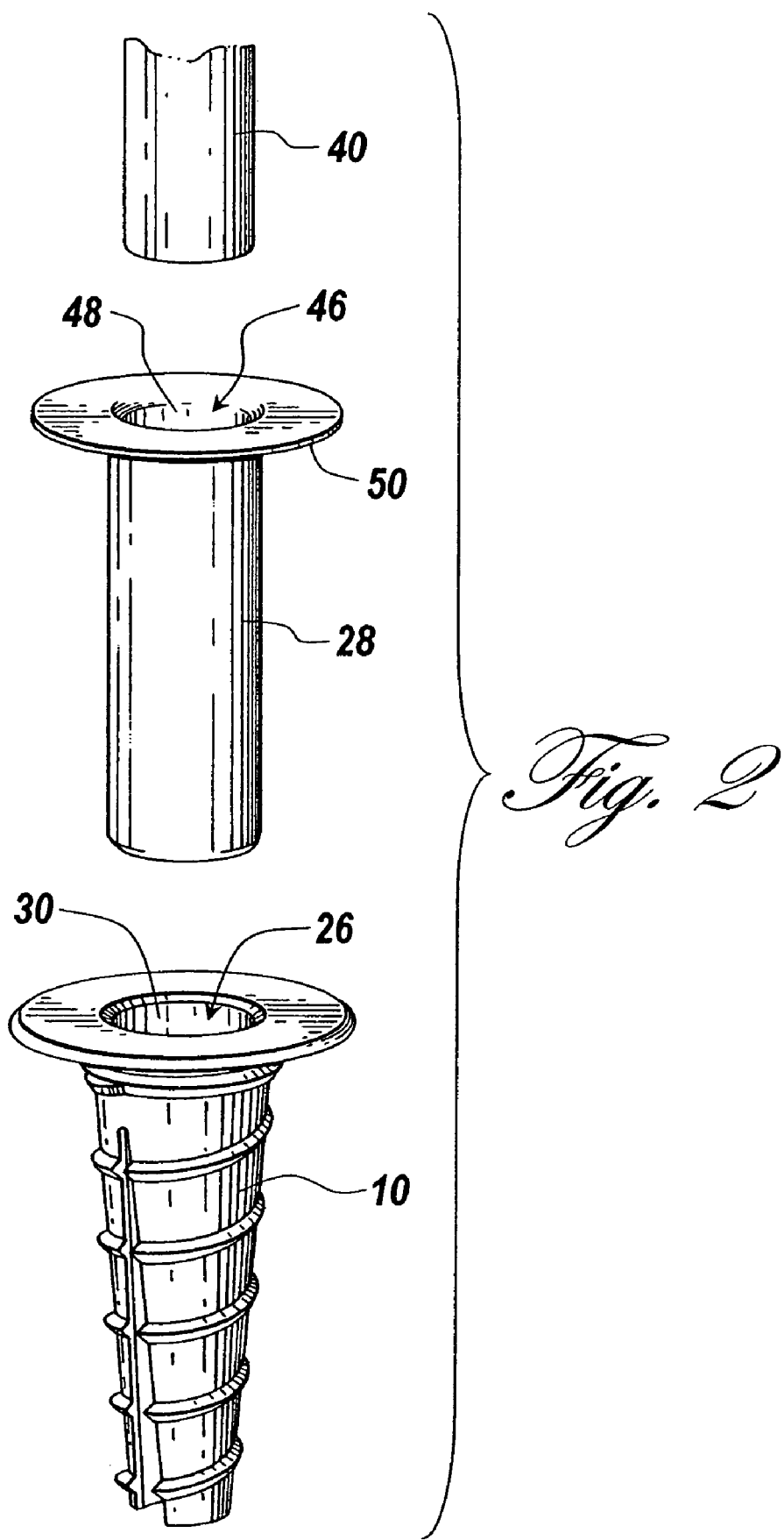
FIG. 2 is an exploded view of the drive anchor with a member coupling and a drive member, according to one aspect of the present invention.

FIG. 2 is a perspective exploded view illustrating one possible combination of elements in accordance with the present invention. The position of each of the elements represents the position just prior to installation of the drive anchor 10. The drive anchor 10 is positioned to receive the member coupling 28. Depending on the configuration of the member coupling 28, a drive member 40 can be received by the member coupling 28 and utilized to apply the driving force required to install the drive anchor 10 and the member coupling 28.

The member coupling 28 can take many different forms, which are restricted primarily by the functional requirements of the member coupling 28. The member coupling has two primary functions, one of which is to aid with the installation of the drive anchor 10, the other of which is to provide a mount for removable and replaceable mounting of a member 52 (see FIG. 3).

With regard to the first function, the member coupling 28 is useful in the installation process of the drive anchor 10, the details of which will be described later herein. The member coupling 28 is sized and dimensioned to fit snugly within the internal cavity 26 of the drive anchor 10, resulting in a friction fit. More specifically, the member coupling 28 must maintain a cross-sectional shape and dimension that enables the insertion of the member coupling 28 into the internal cavity 26 of the drive anchor in a manner that forces the first leg 36 and the second leg 38 of the drive anchor 10 to extend outwardly against walls 42 of a hole 44 in which the drive anchor 10 is placed (see FIG. 3). The size and dimension of the member coupling 28 is sufficient to provide a friction fit with the drive anchor 10, while also forcing the first leg 36 and the second leg 38 outward. Thus, the member coupling 28 has either no taper, or has a less severe taper, than the drive anchor 10. As such, the member coupling 28 can fit through the first opening 30 of the drive anchor 10 (and the flange opening 24 if there is an end flange 22), and progress through the drive anchor 10 to force the first leg 36 and the second leg 38 outward. If the member coupling 28 were to have the same taper as the drive anchor 10, the first and second legs 36 and 38 would not be forced outward upon installation of the member coupling 28. Once the member coupling 28 is fully disposed within the drive anchor 10, both the member coupling 28 and the drive anchor 10 are considered to be installed.

The member coupling 28 further serves the function of receiving the drive member 40 during installation of the member coupling 28 and the drive anchor 10, and also providing an eventual mount for the member 52 (see FIG. 3) that requires mounting. As described below, the drive member 40 couples with the member coupling 28 in a manner that enables force applied to the drive member 40 to translate to the member coupling 28 and drive the member coupling 28 into the drive anchor 10, mounting both the member coupling 28 and the drive anchor 10 in place. In the example embodiment, the member coupling 28 can include a feature 56 disposed at an end of the member coupling 28 opposite the end through which the drive member 40 and the eventually mounted member 52 are able to pass. As shown in the example embodiment, the feature 56 is an end baffler that closes off the end of the member coupling 28. The coupling of the drive member 40 with the member coupling 28, which includes the feature 56, enables force applied to the drive member 40 to translate to the member coupling 28 and drive the member coupling 28 into the drive anchor 10 as described above and further detailed in the description of FIG. 4 below.

The drive member 40 can take a number of different forms, including that of an elongate shaft, or other elongate form, or other configuration. In accordance with one mounting method, the drive member 40 is made of material having properties sufficient to withstand the driving forces capable of pushing the member coupling 28 into place within the drive anchor 10. For example, the drive member 40 can be made of a relatively sturdy material that can receive blows from, e.g., a mallet or hammer. Such materials can include metal, wood, plastic, composite, and the like.

Figure 3:
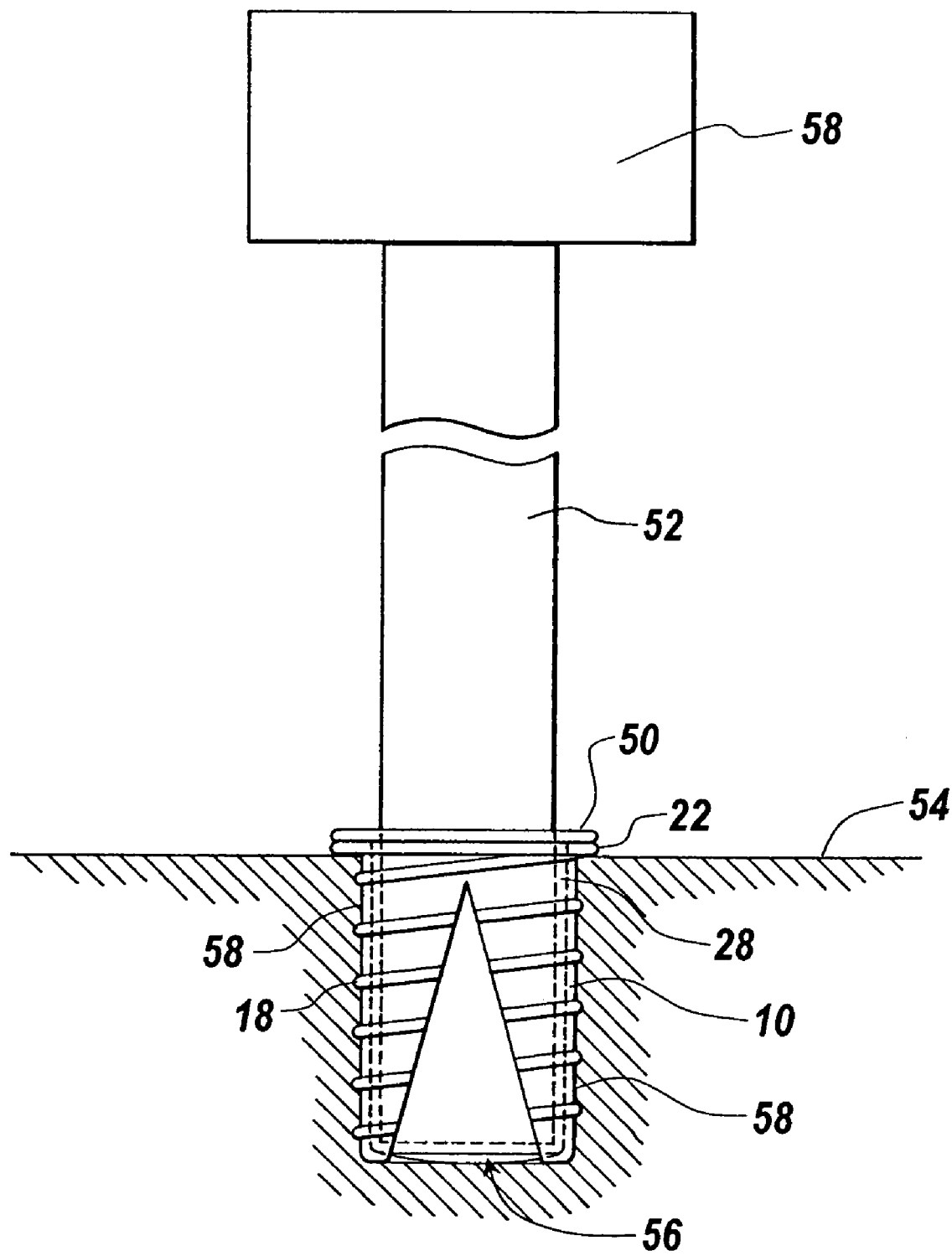
FIG. 3 is a diagrammatic illustration of the drive anchor with the member coupling and a member to be mounted, shown in the fully mounted configuration, according to one aspect of the present invention.

The member coupling 28, with its feature 56 that closes off one end of the member coupling as shown in FIG. 3, has the additional functionality of serving as a mounting location for the member 52 being mounted. In the embodiment of the member coupling 28 illustrated in the figures, the member coupling 28 includes a mount 46, a mount entry point 48, and a member coupling flange 50. The mount 46 illustrated is in the form of an internal cavity similar to the internal cavity 26 of the drive anchor 10. The mount entry point 48 in the illustrated embodiment is similar to the first opening 30 of the drive anchor 10, and provides access or entry to the mount 46. The member coupling 28 can include the member coupling flange 50, which is similar to the end flange 22 of the drive anchor 10. The member coupling 28 couples the member 52 to a surface 54 within which the drive anchor 10 and member coupling 28 are installed in a removable and replaceable manner.

The member coupling 28 can take the form illustrated in the figures, i.e., having the internal cavity, or can have an alternative configuration that still enables a friction mount within the drive anchor 10 and a cavity or other mechanical fastening mechanism that can receive the drive member 40 during installation and the member 52 to be mounted after installation of the drive anchor 10. One of ordinary skill in the art will appreciate that the member coupling can thus have alternate configurations of the mount 46, including but not limited to the internal cavity, a mechanical fastener, an internal thread, a combination thereof, and the like.

FIG. 3 illustrates the drive anchor 10 in the fully installed position within the hole 44 in a surface 54. The hole 44 can be pre-formed, by drill or other hole forming method, such that the drive anchor 10 fits within the hole 44 without significant clearance space between the drive anchor 10 and walls 42 of the hole 44. The surface 54 can be any of a number of different surfaces, including earth, cement, wood, aggregate, and the like, such that the present invention is not limited by the surface 54 type as long as a hole 44 can be formed in a manner sufficient to enable insertion of the drive anchor 10 in a manner that can ultimately support the member 52 being mounted in the drive anchor 10.

The figures show the member 52 as resembling a post-type of elongate structure. However, one of ordinary skill in the art will appreciate that the member 52 is not limited to the shape of a post. In general, the member can be an elongate structure, or a structure having an elongate portion that couples with the member coupling 28, or of some other configuration that couples with the member coupling 28. As such, the member 52 being mounted must be sized and dimensioned, and have an appropriate configuration, to couple with the specific member coupling 28 being used in conjunction with the drive anchor 10. In the example embodiment, the mount 46 is in the form of a hollow cavity. Thus, the member 52 being mounted maintains an elongate shape that fits within the mount 46 in a manner that enables the mount 46 to support the member 52. The member 52 can be, as previously stated, a post, or other structure. The member 52 can further include other components or devices 58 mounted thereon, such as a sign board, a bumper, fencing, and the like, such that there can be any number of different components or items that can be mounted in place using the drive anchor 10 and member coupling 28 of the present invention.

Figure 4:
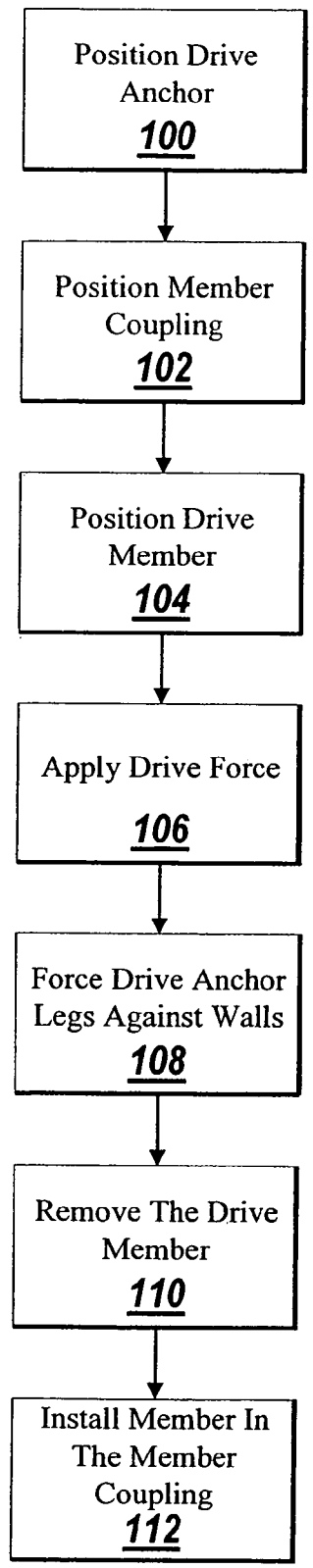
FIG. 4 is a flowchart illustrating the method of mounting the member using the drive anchor, according to one aspect of the present invention.

In operation, the drive anchor 10 of the present invention provides a removable and replaceable mounting option for mounting a member 52 of a variety of different configurations. The installation can occur as follows, and as illustrated in FIG. 4. The drive anchor 10 is positioned in the hole 44 (step 100). The positioning of the drive anchor 10 can occur by simple placement of the drive anchor 10 in the hole 44, or by having to drive the drive anchor 10 into the hole 44 using, e.g., a hammer or the like. The drive anchor is inserted to the position where the end flange 22 of the drive anchor 10 meets with the surface 54 if there is an end flange 22 on the drive anchor 10. The centering ridge 20 helps to center the drive anchor 10 in the hole 44.

The member coupling 28 is then positioned at the first opening 30 of the drive anchor 10 (step 102). The drive member 40 is then positioned on the member coupling 28 (step 104) and a drive force is applied to the drive member 40 to force the member coupling 28 into the internal cavity 26 of the drive anchor 10 (step 106). As the drive member 40 is further driven into the drive anchor 10, the first leg 36 and the second leg 38 are pushed outwardly and against the walls 42 of the hole 44 (step 108) until the member coupling 28 is fully installed. If there is a member coupling flange 50, the member coupling flange 50 meets with the end flange 22 (if there is an end flange 22) or the surface 54 to indicate that the member coupling 28 is fully installed.

The drive member 40 is then removed from the member coupling 28 (step 110). It should be noted that depending on the form of the member 52, the member 52 can be utilized in place of the drive member 40 to install the member coupling 28 and the drive anchor 10. Otherwise, the member 52 can then be inserted at any time into the member coupling 28 to provide a removable and replaceable mount for the member 52 (step 112). The member 52 is not required for mounting the member coupling 28 in the drive anchor 10, nor is the member 52 require for holding the member coupling 28 in the drive anchor 10. In addition, the member 52 is not required for holding the drive anchor 10 in place within the hole 44. In other words, the drive anchor 10 and the member coupling 28 work together to mount or install the drive anchor 10 in the hole 44 without any contribution from the member 52 that is ultimately mounted or installed in the member coupling 28. The drive anchor 10 and member coupling 28 can thus remain installed in the hole 44 and the member 52 can be installed at any later point in time without concern for the drive anchor 10 or the member coupling 28 falling out of the hole 44 or otherwise not remaining installed unless an external force pries the drive anchor 10 or member coupling 28 out of the hole 44.

Figure 5A:
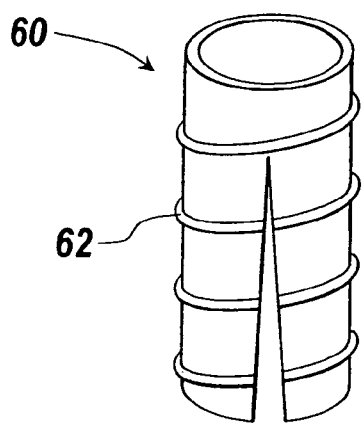
FIGS. 5A, 5B, 5C, 5D, 5E, and 5F are diagrammatic illustrations of different drive anchor cross-sections and surface feature configurations, according to aspects of the present invention.
Figure 5B:
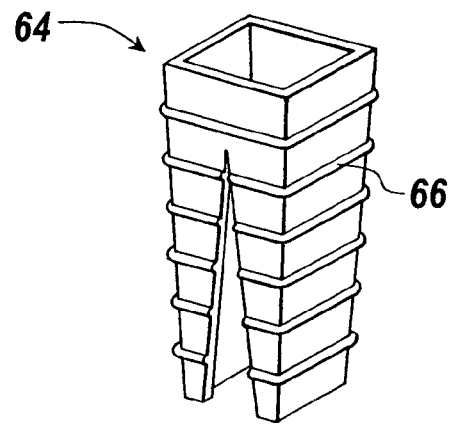
Figure 5C:
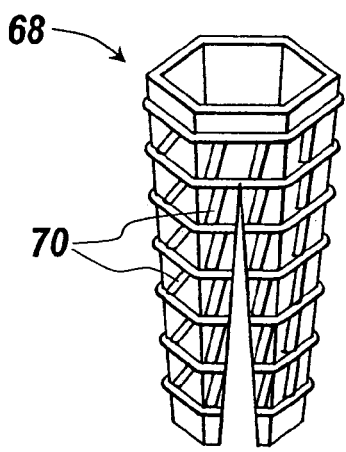
Figure 5D:
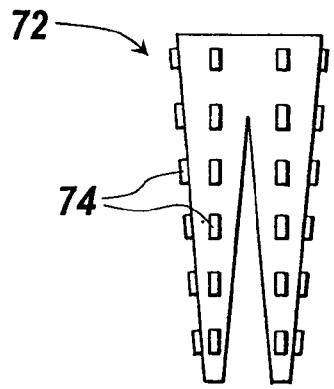
Figure 5E:
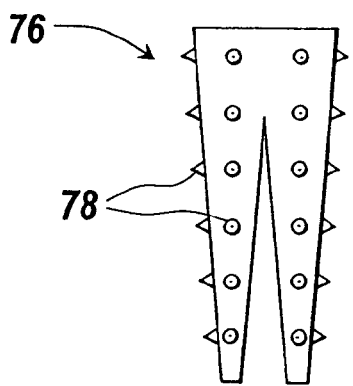
Figure 5F:
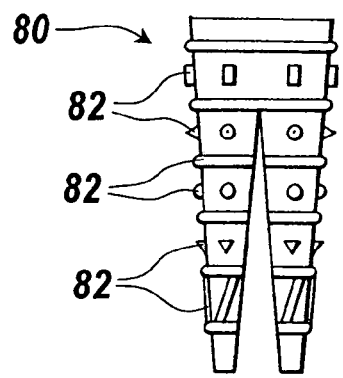

FIGS. 5A through 5F illustrate various combinations of surface features 18 and drive anchor 10 shapes. FIG. 5A shows a drive anchor 60 having a generally circular cross-section with a thread pattern surface feature 62. FIG. 5B shows a drive anchor 64 having a generally rhomboid cross-section and parallel horizontal ridged surface features 66. FIG. 5C shows a drive anchor 68 having a generally hexagonal cross-section and horizontal and diagonal ridged surface features 70. FIG. 5D shows a drive anchor 72 having generally parallelogram shaped surface features 74. FIG. 5E shows a drive anchor 76 having generally spike shaped surface features 78. FIG. 5F shows a drive anchor 80 having a combination of ridges and detents of various patterns as surface features 82. One of ordinary skill in the art will appreciate that the different combinations of drive anchor configurations and surface feature configurations as illustrated are merely representative of different possible variations. However, the present invention is not limited to the specific embodiments illustrated. The drive anchors can have additional different cross-sections and even overall shapes, and the surface features can likewise have different shapes and patterns.

The drive anchor of the present invention provides a fast and efficient system and method for the installation of an anchor in a surface for ultimately supporting a member that requires mounting. The member is easily mounted in a removable and replaceable manner. The drive anchor and member coupling work in conjunction during installation and after the drive anchor is installed to position the drive anchor and hold the drive anchor and member coupling in place. There is no requirement that the member that is ultimately mounted in the drive anchor be involved in the installation of the drive anchor. The drive anchor is frictionally held in place by the outward forces of the bifurcated legs against the walls of the hole in which the drive anchor is positioned, the outward forces being generated by the member coupling and not by the member being mounted. The member being mounted can then easily be positioned and coupled with the member coupling to mount the member. As such, the present invention eliminates the need for a hole to be filled with concrete or other adhesive and allowed to set with the drive anchor inserted therein before the member can be mounted in the drive anchor. Thus, the present invention provides a more efficient mounting method.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

What is claimed is:

1. A drive anchor system for mounting a member, the drive anchor system comprising:
   a drive anchor, comprising:
      a hollow shaft having an internal chamber, an external wall, a first end and a second end;
      a surface feature disposed on the external wall for providing anchoring functionality; and
      a bifurcating crevice extending from the second end of the hollow shaft toward the first end of the hollow shaft, and creating a first leg and a second leg of the hollow shaft;
   a hollow member coupling sized and dimensioned to fit within the internal chamber of the drive anchor, such that the member can mount within the member coupling, the hollow member coupling having a closed end with which the mounting member meets when mounted and an open end opposite the closed end, the open end sized to received the mounting member;

wherein the drive anchor can be positioned in a hole and the member coupling is configured to be driven into the internal chamber expanding the first leg and the second leg outwardly against walls of the hole to frictionally mount the member coupling within the internal chamber and also to frictionally mount the drive anchor within the hole and anchored with the surface feature.

2. The drive anchor system of claim 1, wherein the external wall comprises a longitudinal taper decreasing from the first end to the second end of the hollow shaft.

3. The drive anchor system of claim 1, further comprising an end flange disposed at the first end of the hollow shaft.

4. The drive anchor system of claim 1, further comprising a centering ridge disposed around a perimeter of the hollow shaft proximal to the first end of the hollow shaft to center the hollow shaft in the hole.

5. The drive anchor system of claim 1, further comprising the hollow shaft having a cross-section of a geometric shape.

6. The drive anchor system of claim 5, wherein the geometric shape comprises at least one of a circle, a parallelogram, and a multi-sided shape.

7. The drive anchor system of claim 1, wherein the surface feature comprises at least one ridge.

8. The drive anchor system of claim 1, wherein the surface feature comprises at least one raised protrusion.

9. The drive anchor system of claim 1, wherein the surface feature is disposed along a substantial portion of the external wall of the hollow shaft.

10. The drive anchor system of claim 1, wherein the member coupling closed end comprises a capping structure extending across the closed end of the member coupling.

11. The drive anchor system of claim 1, wherein the member coupling further comprises an end flange.

12. The drive anchor system of claim 1, wherein the mounting member comprises a shaft.

13. The drive anchor system of claim 1, wherein the member coupling is removably and replaceably mounted.

* * * * *